Figure 1:
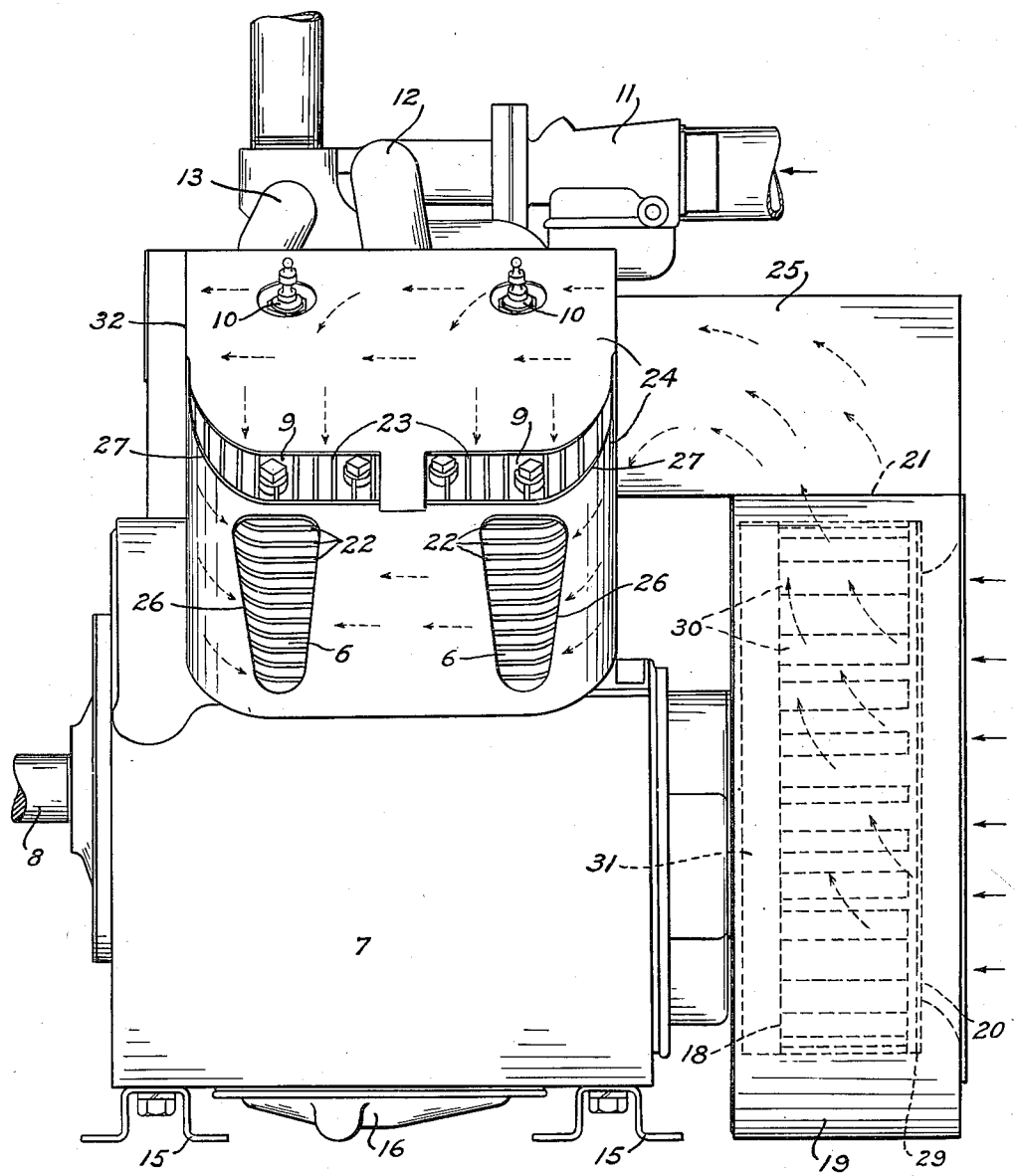

Feb. 12, 1952 C. H. BOUVY 2,585,083
COOLING SYSTEM FOR V-ENGINES
Filed March 7, 1949

INVENTOR
C. H. Bouvy
BY
Lieber & Lieber
ATTORNEYS

Patented Feb. 12, 1952

2,585,083

UNITED STATES PATENT OFFICE 2,585,083

COOLING SYSTEM FOR V-ENGINES

Christian H. Bouvy, Milwaukee, Wis., assignor to Le Roi Company, West Allis, Wis., a corporation of Wisconsin Application March 7, 1949, Serial No. 79,979

1 Claim. (Cl. 123—41.65)

The present invention relates generally to improvements in the art of cooling heat engines, and relates more specifically to improvements in air cooling systems for V-type internal combustion engines or the like.

The primary object of my invention is to provide an improved automatic cooling system for heat engines, which is simple in construction and highly efficient in operation.

It has long been customary to cool the cylinders of internal combustion and other kinds of heat engines, by utilizing a fan or blower for delivering air against the exterior of the cylinder walls in a direction longitudinally of the engine shaft. In order to enhance the cooling effect, it has also been common practice to provide the cylinder walls and heads with external fins; and in the case of engines having cylinders on the opposite sides of the central vertical longitudinal plane of the engine and which were inclined downwardly toward this plane, ordinarily designated as V-engines, it has heretofore been usual practice to force the cooling air along the outer sides of the sloping cylinders and to permit the air to subsequently rise along the front and rear faces thereof so as to eventually escape upwardly through the intervening V-shaped space above the crank case. This particular prior system for cooling V-engines, is objectionable because it necessitates dividing the fan or blower delivery into two paths before any cooling of the cylinders is effected, and also because the hot air escaping from the cylinders is finally discharged against the carburetor and manifolds of the engine.

It is therefore an important object of my present invention to provide an improved air cooling system for V-type engines, which obviates the above mentioned objectionable features and thus results in more effective cooling of the cylinders.

Another important object of this invention is to provide a simple, compact and most efficient mode of cooling V-type internal combustion engines with the aid of air delivered against the heated engine parts by a blower, in a manner whereby the excess heat will be effectively dissipated.

A further important object of the invention is to provide a unique cooling assemblage for heat engines of the V-type, wherein the cylinders may be effectively cooled without necessarily subjecting other parts of the engine to excessive heating due to the delivery of heat dispersing air thereagainst.

Still another object of my invention is to provide various improvements in the construction and operation of air cooling systems for V-type internal combustion engines, whereby such systems will function automatically, while also being readily applicable to engine structures having two or more cylinders.

These and other specific objects and advantages of the invention will be apparent from the following detailed description.

A clear conception of the improved features which constitute the present invention, and of the construction and operation of a typical cooling system embodying the same, may be had by referring to the drawings accompanying and forming a part of this specification in which like reference characters designate the same or similar parts in the various views.

Figure 2:
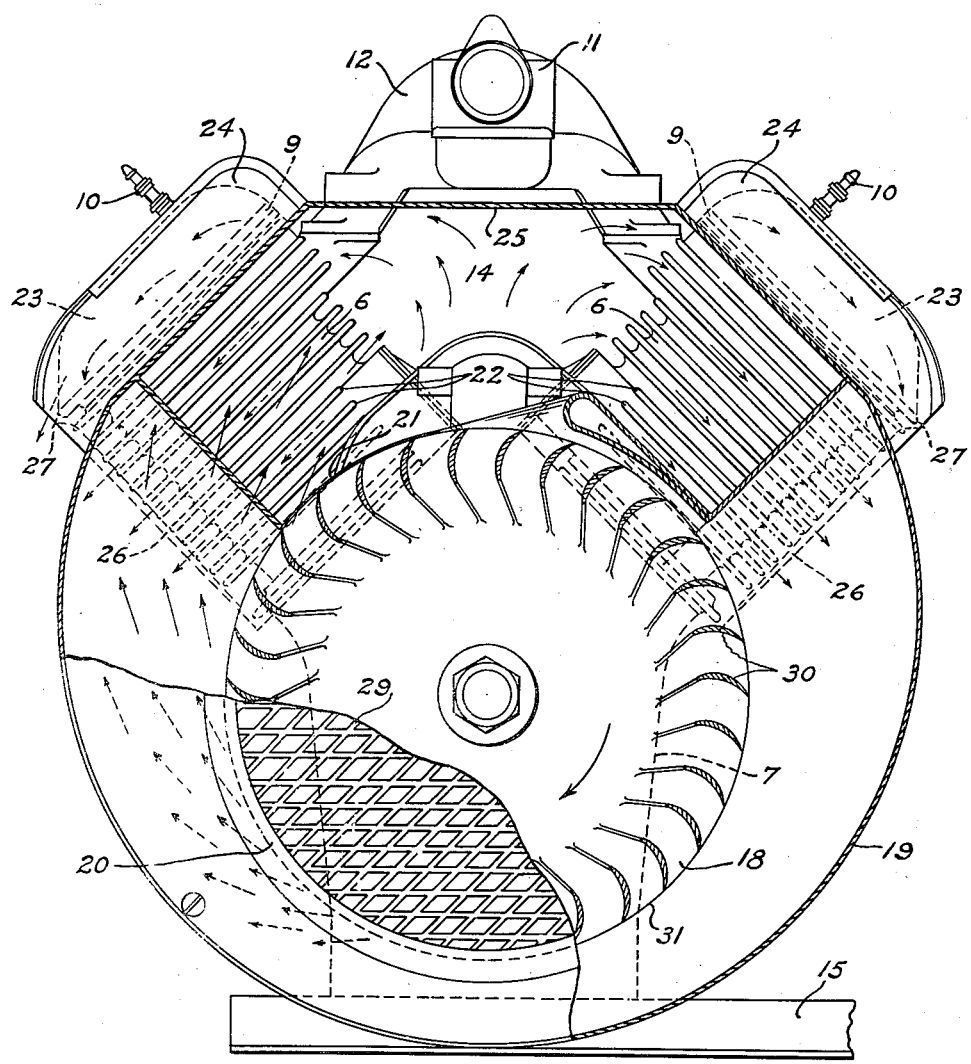
Figure 3:
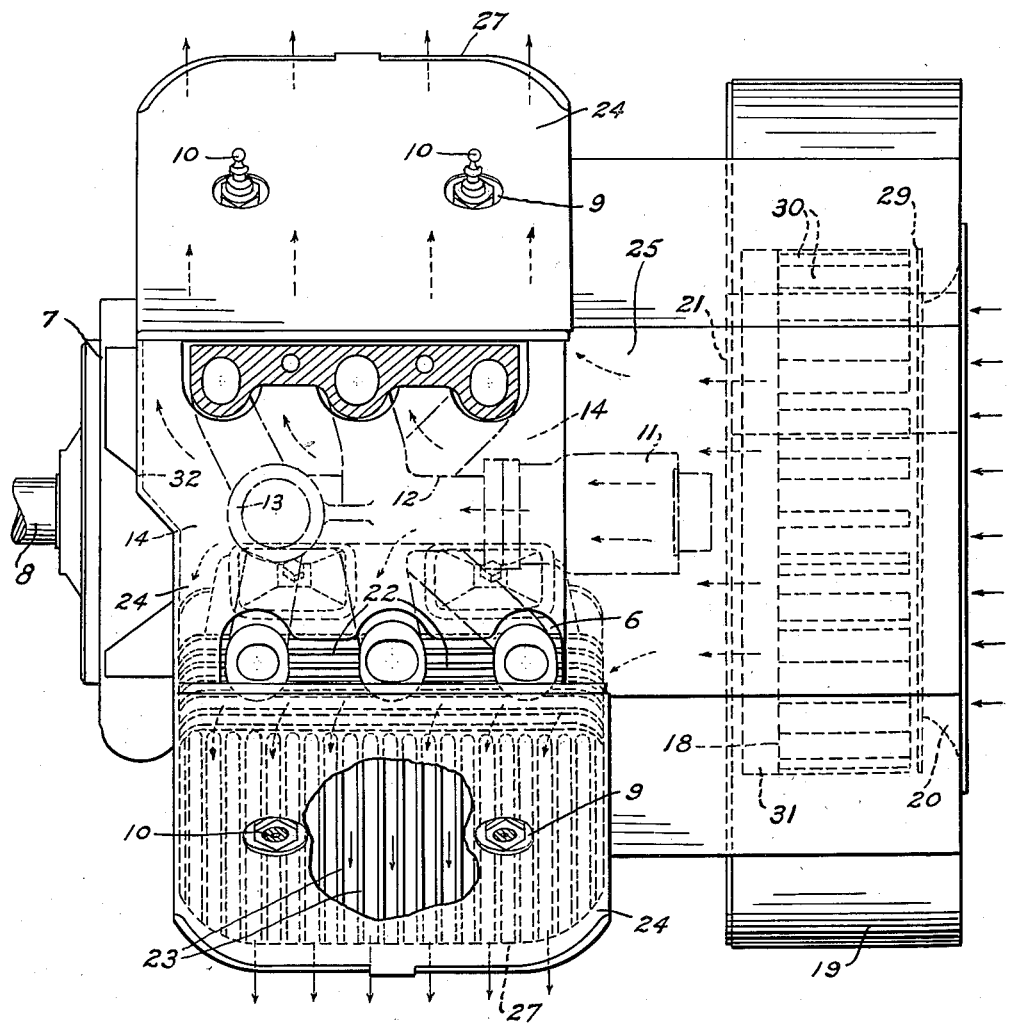

Fig. 1 is a side view of a typical four cylinder V-type internal combustion engine having my improved air cooling system applied thereto;

Fig. 2 is a part sectional end view of the assemblage shown in Fig. 1, the section having been taken through the upper portion of the air propelling fan housing; and Fig. 3 is a part sectional top view of the same engine assembly but having the carburetor and portions of the intake and exhaust manifolds shown in dot-and-dash lines, and also showing the radiating fins of the cylinders and heads only in the lower half of the view for the sake of clearness.

While the invention has been shown and described herein as having been applied only to a four cylinder V-engine of the internal combustion type, it is not my desire or intention to unnecessarily restrict the utility of the improvement by virtue of this limited embodiment; and it is also contemplated that specific descriptive terms used herein be given the broadest possible interpretation consistent with the actual disclosure.

Referring to the drawings, the typical four-cylinder V-type internal combustion engine shown therein by way of illustration, comprises in general two pairs of oppositely inclined cylinders 6 supported upon and radiating from a common crank case 7, and having therein the usual pistons adapted to impart rotary motion to a crank shaft 8 journalled in the casing 7 and extending rearwardly therefrom, see Figs. 1, 2 and 3. Each of the four cylinders 6 is provided with an upper end head 9 having a spark plug 10 associated therewith, and fuel may be injected into the cylinders 6 past a carburetor 11 and through an intake manifold 12, while spent gases of combustion are discharged from the cylinders through an exhaust manifold 13, both of these manifolds 12, 13 preferably being located above the central V-shaped space 14 which separates the two sets of inclined cylinders 6. The engine crank case 7 may be mounted upon suitable supports 15 and may also be provided with a removable lower plate 16 as shown in Fig. 1, and all of this V-engine structure is old and well known.

In accordance with my present invention, I provide an improved air cooling system comprising primarily, a fan or blower rotor 18 located forwardly of the engine crank case 7 and adapted to be driven by the crank shaft 8; a housing 19 for the rotor 18 supported from the crank case 7 and having an axial air inlet opening 20 and a tangential upper outlet 21; substantially annular spaced fins 22 embracing each pair of the inclined cylinders 6; parallel rectilinear or straight fins 23 extending across each pair of the inclined cylinder heads 9 from the uppermost portions to their lowermost edges; and a casing 24 enclosing the cylinders 6, heads 9 and the intervening V-shaped space 14, and communicating at its front end with the upper fan outlet 21 through a duct 25 while its opposite sides are provided with air outlet openings 26, 27 located adjacent to the cylinders 6 and heads 9 respectively.

The fan inlet opening 20 may be provided with a grille 29, and the rotor 18 has an annular series of peripheral vanes or blades 30 secured to an end disk or plate 31 as illustrated in Fig. 2; and the tangential outlet of the fan is located near the lower extremity of the V-space 14 and of the horizontal duct 25, so that the cooling air which is delivered from the fan casing 19 by the revolving rotor 18 will be forced to initially travel rearwardly through the duct 25 and space 14 in succession. The casing 24 besides enclosing the space 14 and the cylinders 6 and heads 9 except for the openings 26, 27, also segregates the intake and exhaust manifolds 12, 13 from the cooling air confining chambers and passages; and the casing 24 is preferably provided with a rear end wall 32 adapted to direct the cooling air stream outwardly toward the inclined cylinders 6 and heads 9.

With the cooling assemblage thus constructed, during normal operation of the internal combustion engine the fan rotor 18 will be revolving to continuously draw fresh air through the inlet opening 20 and to deliver the air tangentially through the upper outlet 21 into the horizontal duct 25 as illustrated in Figs. 1 and 2. The stream of cooling air then flows rearwardly through the duct 25 and through the V-shaped space 14, and is eventually divided into two lateral streams as indicated by the arrows in the drawing and especially in Fig. 3. Each of the stream divisions thereafter advances laterally or outwardly and downwardly away from the central longitudinal vertical plane of the engine, along and between the spaced cylinder and head fins 22, 23, thus effectively cooling the cylinders 6 and heads 9, and the heated or spent cooling air is finally discharged from the system through the opposite side openings 26, 27.

This functioning of the air cooled system is both continuous and automatic whenever the motor is operating, and since the V-shaped space 14 between the inclined cylinders 6 is constantly being supplied with fresh and relatively cool air, and because the carburetor 11 and intake manifold 12, are located above and externally of the space 14, these parts are not subjected to undesirable heating. The exhaust manifold 13 is also disposed externally above the space 14, thus avoiding the addition of heat to the cooling air for the cylinders 6 and heads 9. The end wall 32 of the casing 24 serves to divert the air stream outwardly, while the outwardly and downwardly inclined air stream confining portions of the casing 24 which coact with the head fins 23 cooperate with the similarly inclined cylinder fins 22 to guide the air stream divisions downwardly and outwardly into the ambient atmosphere far away from the fresh air intake. The enclosing casing 24, and the improved disposition of the heat transfer fins 22, 23 therefore cooperate to insure most effective and rapid dispersement of the excess heat, and the casing 24 may obviously be formed of several removable sections so as to facilitate inspection of normally concealed engine parts and to permit convenient application of the casing to the cylinders 6 and heads 9.

From the foregoing description of the construction and operation of the improved cooling system, it should be apparent that I have in fact provided a simple, compact and highly effective air cooling assemblage especially applicable to V-type engines or motors. The improved system may be advantageously applied either to stationary or movable engines having two or more inclined cylinders radiating from a common crank case; and by causing the cylinder fins 22 to embrace the cylinders 6 perpendicular to the cylinder axes, while the head fins 23 are disposed in vertical planes extending outwardly across the heads 9, these normally heated elements will be rapidly and effectively air cooled. The segregation of the carburetor and intake and exhaust manifolds from the cooling air confining passages and the downward and outward delivery of the heated air, is also of considerable importance since it eliminates overheating of these external parts, and the improved system may be readily applied to old or new motors at moderate cost. The improved location of the air supply fan furthermore insures an abundant supply of fresh cooling air at all times, and the fan rotor 18 may be revolved at any desired speed directly from the crank shaft 8.

It should be understood that it is not desired to limit the invention to the exact details of construction or to the precise mode of operation of the engine cooling system herein specifically illustrated and described, for various modifications within the scope of the appended claim may occur to persons skilled in the art.

I claim:

An air cooled heat engine comprising, a main horizontal engine shaft, cylinders radiating upwardly from said shaft to provide an unobstructed intervening V-space converging from the shaft, the cylinders on opposite sides of said space being connected by exhaust manifolds disposed above said space and each cylinder having a circular wall embraced by parallel annular fins forming downwardly and outwardly inclined passages in open communication with said space, end heads at the upper ends of said cylinders spanned by parallel rectilinear fins forming outwardly and downwardly inclined straight passages also in open communication with said space, a casing enclosing said cylinder fins and having restricted outlet openings for the adjacent passages and also covering the upper sides of said head passages and extending across one end of the widest upper portion of said space beneath the manifolds, and a blower directly operable by said shaft to deliver air into the opposite end of said space and downwardly and outwardly therefrom through all of said passages and said outlets.

CHRISTIAN H. BOUVY.

REFERENCES CITED

The following references are of record in the file of this patent:

UNITED STATES PATENTS

| Number | Name | Date |
|---|---|---|
| 1,555,807 | Burtnett | Sept. 29, 1925 |
| 1,896,222 | Chilton | Feb. 7, 1933 |
| 2,082,869 | Brown | June 8, 1937 |
| 2,236,223 | Mickl | Mar. 25, 1941 |

FOREIGN PATENTS

| Number | Country | Date |
|---|---|---|
| 97,656 | Sweden | Dec. 19, 1939 |
| 872,991 | France | Mar. 2, 1942 |